H. EWOLDT.
THRESHING MACHINE.
APPLICATION FILED FEB. 12, 1910.

978,570.

Patented Dec. 13, 1910.

3 SHEETS—SHEET 2.

WITNESSES:

INVENTOR
Henry Ewoldt
BY
ATTORNEYS

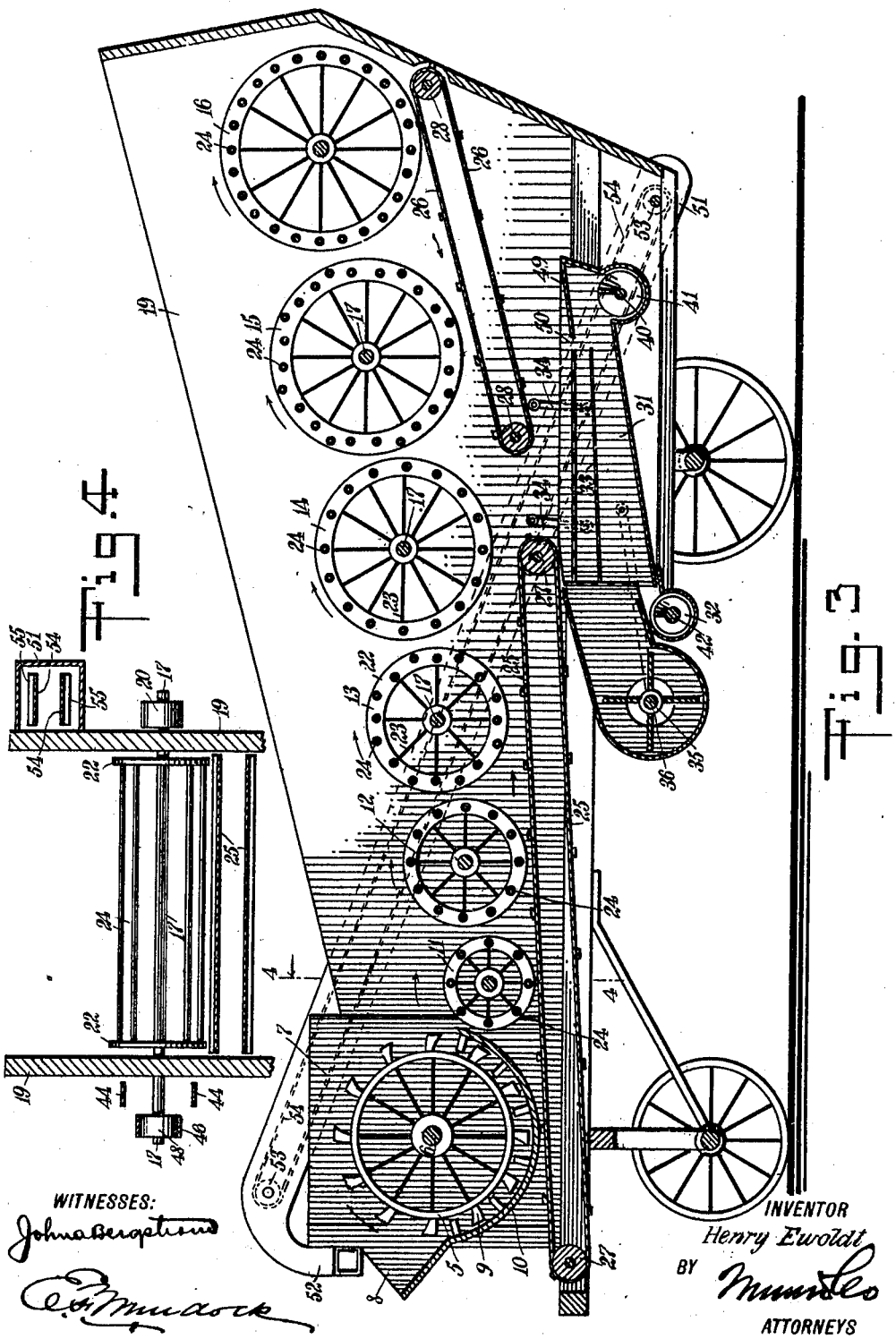

UNITED STATES PATENT OFFICE.

HENRY EWOLDT, OF GRAND ISLAND, NEBRASKA.

THRESHING-MACHINE.

978,570.  Specification of Letters Patent.  Patented Dec. 13, 1910.

Application filed February 12, 1910.  Serial No. 543,507.

*To all whom it may concern:*

Be it known that I, HENRY EWOLDT, a citizen of the United States, and a resident of Grand Island, in the county of Hall and State of Nebraska, have invented a new and Improved Threshing-Machine, of which the following is a full, clear, and exact description.

Among the principal objects which the present invention has in view are: to provide a threshing machine of novel construction and operation; to provide novel and efficient means for separating the grain and straw preliminary to the introduction of the same on the winnowing tables; and to provide a construction for a threshing machine which is durable, efficient and economical.

One embodiment of the present invention is disclosed in the structure illustrated in the accompanying drawings, in which like characters of reference denote corresponding parts in all the views, and in which—

Figure 1:
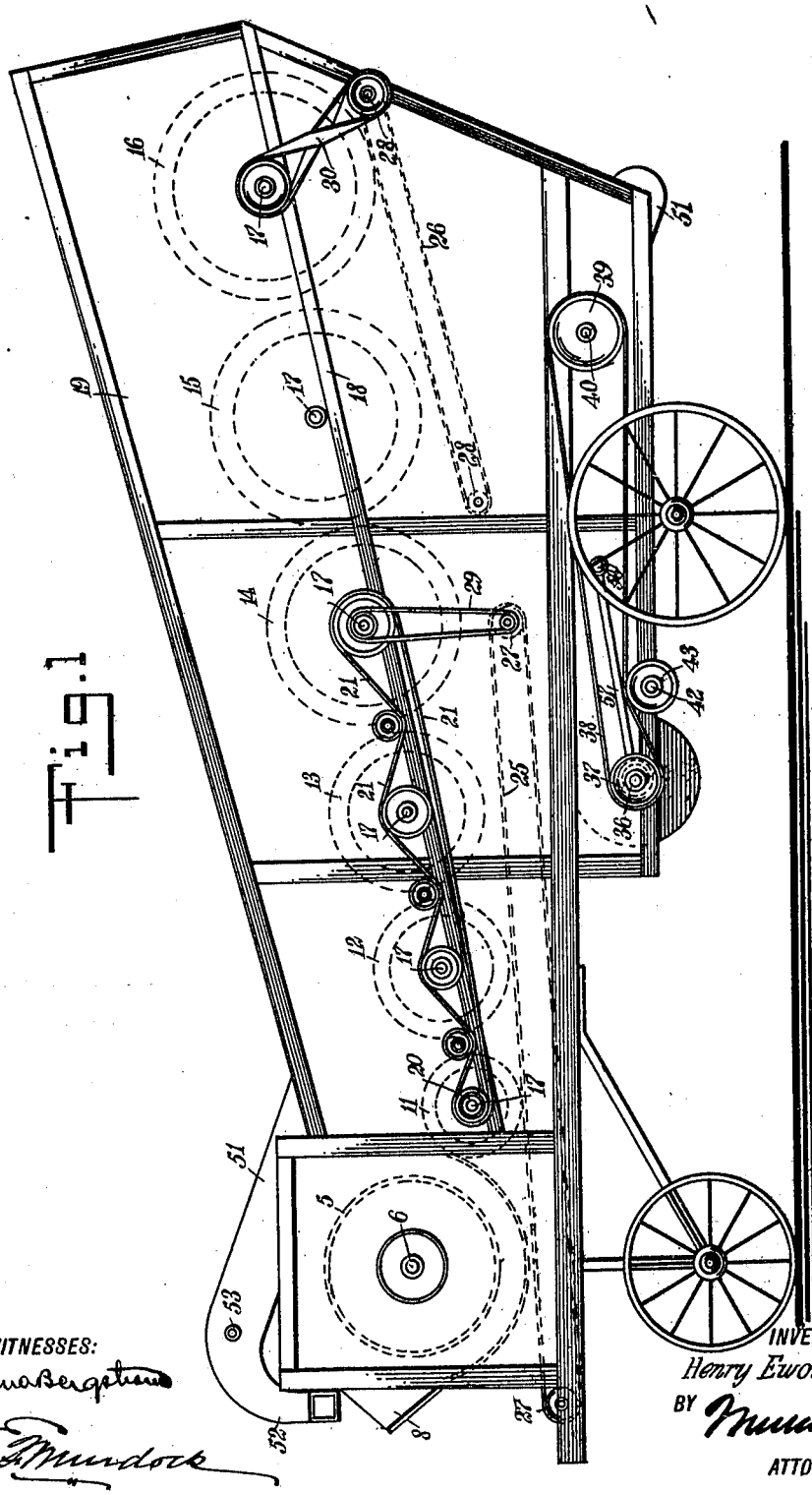
Figure 2:
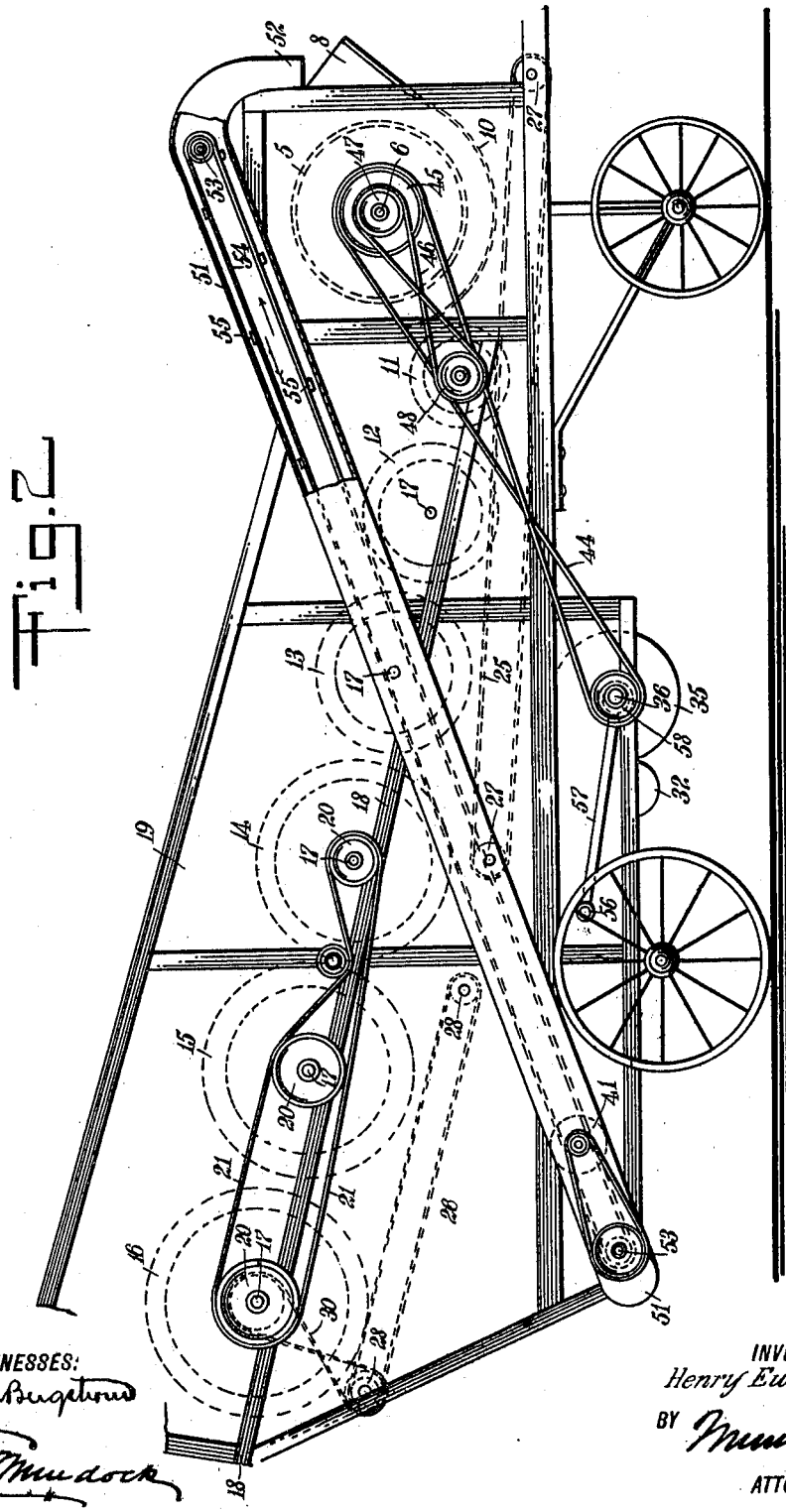

Figure 1 is an elevation of one side of a machine constructed and arranged in accordance with the present invention; Fig. 2 is an elevation of the side of the machine opposite that shown in Fig. 1; Fig. 3 is a longitudinal vertical section of the machine constructed and arranged in accordance with the present invention; and Fig. 4 is a vertical section taken on the line 4—4 in Fig. 3.

In the present invention a threshing cylinder 5 is pivotally mounted upon a shaft 6, between cheek pieces 7, 7 of the hopper having a receiving chute 8. The drum 5 is provided with a series of projections 9, 9, which strike upon and advance the grain bearing straw over the concave bottom 10 of the said hopper. The end of the concave bottom 10 is adjacent to a rotary drum 11. The drum 11 is the first of a series of drums 11, 12, 13, 14, 15 and 16. The drums are gradually increased in diameter from the drum 11 to the drum 16. The drums are mounted upon shafts 17, 17, which shafts are carried in bearings formed on stringers 18, 18 outside of the cheek pieces 19, 19. The shafts 17, 17 of the drums 11, 12, 13 and 14 are each provided with a pulley 20, the said pulleys being increased in diameter in the same ratio as the drums to which they are attached. The said pulleys are connected in driven relation by transmission belts 21, 21. The arrangement of the belts 21, 21 is such, that the said shafts and drums carried thereby are rotated each in the same rotary direction, which rotary direction is indicated by arrows in Fig. 3 of the drawings, whereby the straw, on being received from the concave bottom 10 of the hopper by the drum 11, is, by it, advanced to the drum 12, to be thereby carried over the top of the said drum, to be delivered in turn to the drum 13, and so on, each drum receiving the straw from the preceding drum and carrying it forward and over the top of the said drum, to be delivered to the next succeeding drum. It will be noticed that the gap separating the shafts for the said drums is progressively increased, causing the straw, in passing from drum to drum to travel for a greater peripheral distance on each of the said succeeding drums. It is during the transference of the straw from drum to drum that the grain bearing tufts or heads and the non-grain bearing stems or bodies are separated. It is to permit the short lengths and heads of grain or separated grain, to pass through the drums 11 to 16 inclusive, that the said drums are formed with circular heads or rings 22, 22. The rings 22, 22 are supported in fixed relation upon the shafts 17 by spokes 23, 23. The spokes 23 may be substituted by solid heads or disks. The heads, whether constructed from the rings 22, 22, or disks, as mentioned, are transversely connected by bars 24, 24. The bars 24 are preferably formed by me of small tubing. In the present device they are preferably constructed from quarter inch pipe, through the center of which is extended a pin bolt, extended through the rings 22 in proper position, and there headed or riveted. The bars 24 are spaced suitable distances apart, that preferred by me being about three inches. The bars 24 on the drums 11, 12, 14 and 16 are disposed concentrically with the shaft 17 upon which the said drums are mounted. The drums 13 and 15 are provided with the bars 24 disposed in the polygonal or triangular arrangement illustrated in Fig. 3. By means of this arrangement in the drums 13 and 15, the straw as received from the drums 12 and 14 has imparted thereto an irregular action, resulting in a shaking or whipping of the said straw, the purpose of which is to separate the grain bearing heads or tufts and loose adhering grain from the straw body.

The stringers 18, 18 on which are mounted the bearings for the shafts 17, 17, are inclined in the manner shown in the drawings. The series of drums 11 to 16 inclusive is sufficiently long to provide a path for the straw, wherein the loose grain, and head bearing sections thereof, may be separated. As the heads and small grain are separated, they drop through the bars 24, 24 and between the drums composed thereof, upon conveyers 25 and 26. The conveyers 25 and 26 are supported upon drums 27, 27 and 28, 28. The drums 27, 27 and 28, 28 are driven by short belts 29 and 30 respectively from the shafts of the drums 14 and 16 respectively. The belt 30 is twisted, as shown in Fig. 1 of the drawings, whereby is imparted to the drum 28 a rotary direction opposite that of the drum 16 and the drum 14. The drum 27 is connected to the shaft of the drum 14 by a straight belt 29, and has imparted thereto the same rotary direction imparted to the series of drums. The result of the transmission described is that the conveyers 25 and 26 move in opposite directions, the upper reaches thereof moving in the direction of the arrows shown in Fig. 3, toward the separating opening between the ends of the two conveyers. By means of this arrangement the grain bearing heads and loose grain falling from the straw are delivered by both of the said conveyers into the opening mentioned. Directly below the said opening is a shoe 31, the inclined bottom of which leads directly into a cylinder containing an auger conveyer 32. The shoe 31 is vibrated in any suitable manner. That preferred by me is to connect the shoe pivotally at 56 to a pitman 57, which is driven by an eccentric wheel 58. While I prefer this construction, however, it will be understood that such variation as the substitution for the eccentric of a crank extension on the shaft 36 is included by me in the present invention. Interposed between the inclined bottom of the shoe 31 and the separating opening between the two conveyers 25 and 26, are winnowing tables 33, 33. The tables 33, 33 are perforated, as illustrated in Fig. 3 of the drawings, and as is common to the art, and are mounted upon links 34, 34, to be rapidly vibrated or rocked to distribute the material as received upon the surface of the tables. The shoe 31 is provided with a fan 35, the delivery opening whereof is directed below and slantwise under the said tables 33, 33. The fan 35 is driven from a shaft 36 and a pulley 37 by means of a belt 38 connected with a pulley 39, as illustrated in Fig. 1 of the drawings. The pulley 39 is mounted upon a shaft 40, upon which is mounted the auger blade of a conveyer 41. From the shaft 36, by means of the belt 38, is driven the shaft 40 and the shaft 42 of the conveyers 41 and 32 respectively. The shaft 42 is provided with a pulley 43, over which the belt 38 is reeved in the manner shown in Fig. 1 of the drawings. The shaft 36 is driven from the shaft 6 of the threshing cylinder 5 by means of a belt 44 and a pulley 45 with which the said shaft 6 is fixedly provided. The series of drums 11 to 16 inclusive is rotated by power transmitted from the shaft 6 through the belt 46 from a pulley 47 mounted on the said shaft 6, and preferably at the outer side of the pulley 45. The belt 46 is reeved about a pulley 48 fixedly mounted upon the shaft 17 of the drum 11. The shaft 6 of the threshing cylinder 5 is driven from any suitable source of power.

By the operation of the fan 35, the chaff and light material is carried over the tailing board to pass behind the same upon the ground. The heavier material, such as tailing, is caught upon the inclined surface of a board 49 and delivered through an opening 50 between the end of the board 49 and the table 33, upon the inclined bottom of the shoe 31. If the material thus delivered is separated grain wholly or in part, it will work down the inclined bottom of the said shoe until delivered to the conveyer 32, from whence it is delivered outside the machine into a suitable receptacle. If, however, the grain be attached to tailings or straw particles sufficiently large to be influenced by the draft received from the fan 35, these would be carried back along the bottom of the shoe 31, and at the rear thereof delivered to the conveyer 41. In operating, the conveyer 41 delivers its product on the inclined bottom of a conveyer 51. The rectangular box-like frame of the conveyer 51 is mounted on the side of the machine, as shown in dotted lines in Fig. 3, the upper end whereof is provided with a delivering chute 52 arranged to deliver into the chute 8 of the feed hopper at the forward end of the machine.

Mounted within the rectangular box-like frame of the conveyer 51, and upon rotary drums 53, 53, is an endless conveyer belt 54. The belts employed as conveyers in this machine are all provided with transverse cleats 55, which in the conveyer 51 scrape along the bottom thereof, and in this manner convey the tailings as received from the conveyer 41 within the conveyer 51, upward therein, to deliver the same through the chute 52 to the chute 8. In this manner the tailings are rethreshed until separated from the grain particles, and the chaff is carried over the tailing board 49 to be deposited on the ground.

When the grain bearing straw is delivered over the last drum 16, it is passed between the said drum and the frame of the machine, and delivered on the upper end of the conveyer belt 26. The movement of the conveyer 26 delivers the straw thus received upon the tables 33, to be there subjected to the action of the air draft from the fan 35, and to be thus winnowed from the heavier heads or loose grain. The weight of the straw stems is not sufficient to resist the draft of the air, and like the chaff above mentioned the said stems, denuded of their grain, are lifted by the draft over the tail board 49 to be delivered upon the ground.

Having thus described my invention, what I claim as new and desire to secure by Letters Patent is:—

1. A threshing machine, comprising a plurality of open sided rotary carrying drums arranged in two series, one of said series having peripheries polygonal in section and one series having peripheries circular in section, said series being arranged alternately.

2. A threshing machine, comprising a plurality of rotary carrying drums the sides whereof are composed of a plurality of closely disposed parallel rods, said drums being arranged in two series, one of which is provided with peripheries polygonal in section and the other of which is provided with peripheries circular in section, the said series being arranged in alternate disposition.

3. A threshing machine, comprising a plurality of open sided rotary carrying drums arranged in two series, one of said series having peripheries polygonal in section, and one of said series having peripheries circular in section, said series being arranged alternately, and said drums being progressively increased in diameter from the receiving to the delivering end of said drums.

4. A threshing machine, comprising a plurality of rotary carrying drums disposed in series, each drum being formed to a diameter greater than the diameter of the drum preceding in the said series, and said drums being arranged in two series, one of which series is provided with peripheries polygonal in section, and one of said series provided with peripheries circular in section, the said series being arranged in alternate disposition.

In testimony whereof I have signed this specification in the presence of two subscribing witnesses.

HENRY EWOLDT.

Witnesses:
CHAS. G. RYAN,
EDWARD P. LIDEVMEM.